US011263758B2

(12) United States Patent
Freeman-Powell

(10) Patent No.: US 11,263,758 B2
(45) Date of Patent: Mar. 1, 2022

(54) IMAGE PROCESSING METHOD AND APPARATUS

(71) Applicant: JAGUAR LAND ROVER LIMITED, Coventry (GB)

(72) Inventor: Aaron Freeman-Powell, Warwickshire (GB)

(73) Assignee: Jaguar Land Rover Limited, Coventry (GB)

(*) Notice: Subject to any disclaimer, the term of this patent is extended or adjusted under 35 U.S.C. 154(b) by 0 days.

(21) Appl. No.: 16/648,193

(22) PCT Filed: Jul. 11, 2018

(86) PCT No.: PCT/EP2018/068747
§ 371 (c)(1),
(2) Date: Mar. 17, 2020

(87) PCT Pub. No.: WO2019/052711
PCT Pub. Date: Mar. 21, 2019

(65) Prior Publication Data
US 2020/0286244 A1 Sep. 10, 2020

(30) Foreign Application Priority Data
Sep. 18, 2017 (GB) ...................................... 1714973

(51) Int. Cl.
G06T 7/215 (2017.01)
G06T 7/269 (2017.01)
(Continued)

(52) U.S. Cl.
CPC .............. G06T 7/215 (2017.01); G06T 7/174 (2017.01); G06T 7/269 (2017.01); G06T 11/60 (2013.01); G06T 2207/30252 (2013.01)

(58) Field of Classification Search
CPC ......... G06T 7/215; G06T 7/269; G06T 7/174; G06T 11/60; G06T 2207/30252;
(Continued)

(56) References Cited

U.S. PATENT DOCUMENTS 9,633,566 B2 * 4/2017 Skvarce ............ B62D 15/0275
10,589,680 B2 * 3/2020 Ward ..................... H04N 7/181
(Continued)

FOREIGN PATENT DOCUMENTS

DE 102012023060 A1 6/2014
WO 2014172875 A1 10/2014
WO 2016026870 A1 2/2016

OTHER PUBLICATIONS

DeepTrailerAssist: Deep Learning based trailer detection, tracking and articulation angle estimation on automotive rear-view camera (Year: 2019).*
(Continued)

Primary Examiner — Nizar N Sivji
(74) Attorney, Agent, or Firm — McCoy Russell LLP

(57) ABSTRACT

The present disclosure relates to a controller (2) for identifying a periphery of a towed vehicle (T) connected to a towing vehicle (V). The controller (2) is configured to receive towing vehicle image data (DV1) corresponding to a towing vehicle image (IMG1) captured by a towing vehicle camera (C1). The towing vehicle image data (DV1) is processed to generate a plurality of movement vector. The periphery (P1) of the towed vehicle (T) is identified in dependence on the plurality of movement vectors. The present disclosure also relates to a method of identifying the periphery (P1) of a towed vehicle (T).

12 Claims, 8 Drawing Sheets

(51) Int. Cl.
*G06T 7/174* (2017.01)
*G06T 11/60* (2006.01)

(58) Field of Classification Search
CPC . G06T 7/194; G06T 7/00; G06T 2207/10016; G06T 2207/30261; G06T 7/246
See application file for complete search history.

(56) References Cited

U.S. PATENT DOCUMENTS

| | | | |
|---|---|---|---|
| 2009/0140881 A1* | 6/2009 | Sakai | B60R 1/00 340/901 |
| 2010/0171828 A1* | 7/2010 | Ishii | G06T 7/246 348/135 |
| 2014/0085472 A1* | 3/2014 | Lu | B60R 1/002 348/148 |
| 2014/0160276 A1 | 6/2014 | Pliefke et al. | |
| 2015/0286878 A1* | 10/2015 | Molin | H04N 5/2624 348/148 |
| 2016/0210757 A1* | 7/2016 | Lavoie | G06K 9/52 |
| 2017/0174023 A1* | 6/2017 | Hu | B60D 1/06 |
| 2017/0177949 A1 | 6/2017 | Hu et al. | |
| 2017/0277952 A1* | 9/2017 | Thommes | G08G 1/056 |
| 2019/0172218 A1* | 6/2019 | Maruoka | B60K 35/00 |

OTHER PUBLICATIONS

Combined Search and Examination Report, GB1714973.3, dated Feb. 22, 2018, 5 pages.
International Search Report and Written Opinion, PCT/EP2018/068747, dated Aug. 20, 2018, 12 pages.
Thompson et al., "Edge Detection in Optical Flow Fields," Proceedings of the Second National Conference on Artificial Intelligence, Jan. 1, 1982, pp. 26-29.

* cited by examiner

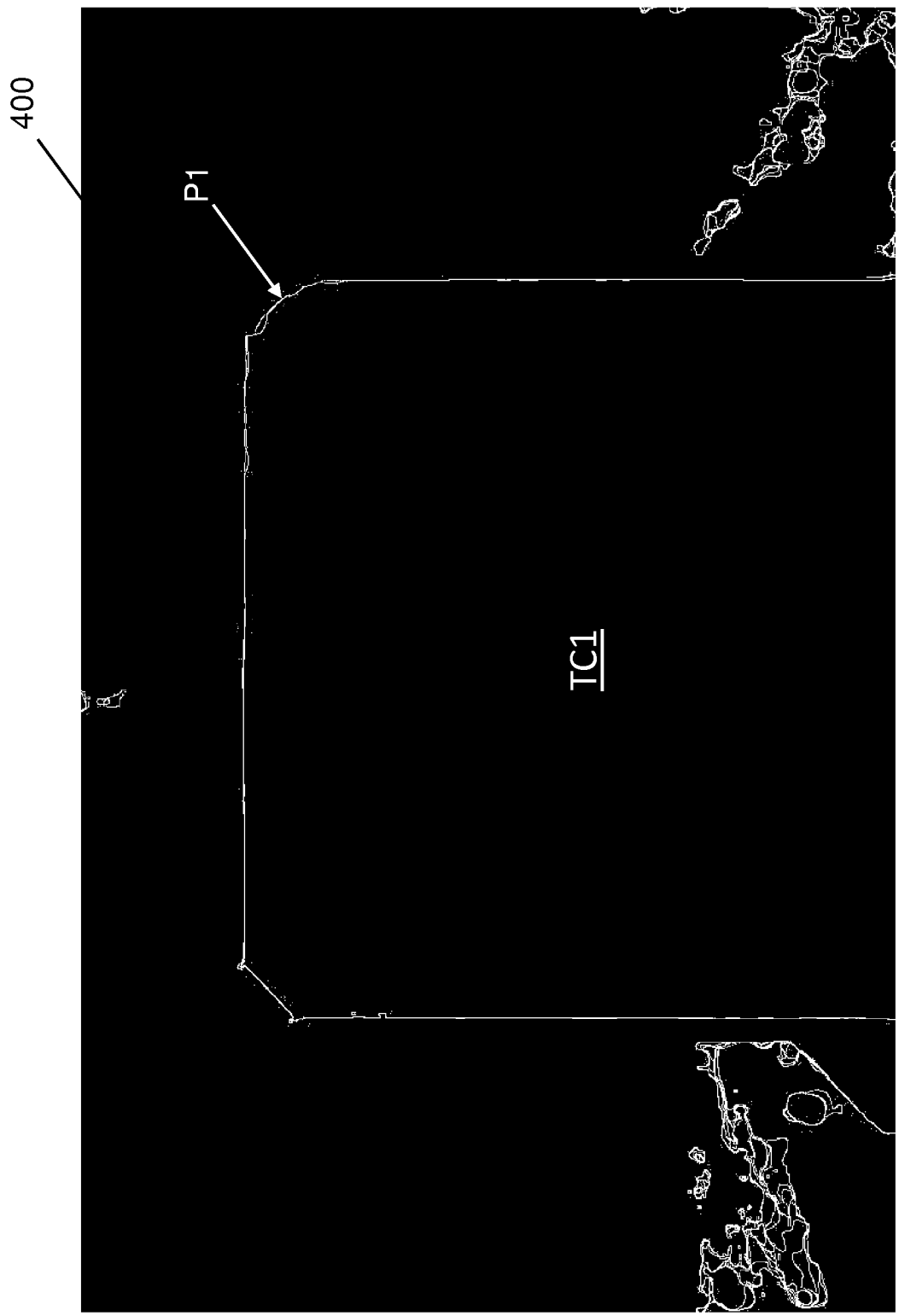

IMAGE PROCESSING METHOD AND APPARATUS

CROSS-REFERENCE TO RELATED APPLICATIONS

This application is a 371 of International Application No. PCT/EP2018/068747, filed Jul. 11, 2018, which claims priority to GB Patent Application 1714973.3, filed Sep. 18, 2017, the contents of both of which are incorporated by reference herein in their entirety.

TECHNICAL FIELD

The present disclosure relates to an image processing method and apparatus. In particular, but not exclusively, the present disclosure relates to a method and apparatus for identifying a target object in an image disposed on a vehicle.

BACKGROUND

It is known to use cameras on a vehicle and to display images from those cameras to assist the driver. For example, it is known to provide a rear-facing camera in a bumper of the vehicle to facilitate parking the vehicle. The images can provide a useful source of additional information to the driver, for example to identify potential obstacles. In order to facilitate maneuvering of a towed vehicle, such as a trailer, it is known to provide cameras on the towing vehicle and the trailer. A camera may, for example, be provided at the rear of the trailer to facilitate reversing the trailer. It is known from the Applicant's earlier application GB1414632.8 to combine images from a camera provided on the vehicle with images from a camera provided on the trailer. The resulting composite image may be output to provide a driver aid. The present invention(s) relates to developments and modifications of these types of display systems.

SUMMARY OF THE INVENTION

Aspects of the present invention relate to a controller, a method and a non-transitory computer-readable medium as claimed in the appended claims.

According to a further aspect of the present invention there is provided a controller for identifying a periphery of a towed vehicle connected to a towing vehicle, the controller being configured to:

receive towing vehicle image data corresponding to a towing vehicle image captured by a towing vehicle camera;

process the towing vehicle image data to generate a plurality of movement vectors; and identify the periphery of the towed vehicle in dependence on the plurality of movement vectors. The controller generates movement vectors which may then used to differentiate between different features of the towing vehicle image. The periphery represents the external visible boundary (or edge) of the towed vehicle when viewed from the perspective of the vehicle mounted camera. By comparing the movement vectors, the periphery can be identified to facilitate processing, for example to facilitate blending with another image. At least in certain embodiments, the periphery can be identified automatically, thereby removing or reducing the need for the user to specify the boundary of the towed vehicle. A portion or sub-set of the towing vehicle image corresponding to the trailer may be selected based on the identified periphery of the towed vehicle. A trailer image component may be extracted, for example to be combined with image data from a separate source.

At least in certain embodiments, the controller may identify the periphery of the towed vehicle when the towing vehicle and the towed vehicle are both moving, Indeed, the movement vectors may enable the controller to differentiate between the towed vehicle and the background or surrounding features which move relative to each other when the towing vehicle and the towed vehicle are in motion. The controller may be configured to identify the periphery of the towed vehicle only when a reference speed of the vehicle is greater than or equal to a predefined speed threshold. Alternatively, the controller may be configured to identify the periphery of the towed vehicle only when an average magnitude of the movement vectors exceeds a predefined threshold.

The movement vectors may each comprise a magnitude. The movement vectors may each comprise a scalar value having x and y directional components (where x and y correspond to image axes). The x and y directional components may be combined to determine the magnitude of each movement vector.

The magnitude of the movement vectors may comprise an instant magnitude, for example determined at a predetermined time intervals. Alternatively, the magnitude of the movement vectors may be analysed with respect to time. For example, an average or mean magnitude may be determined with respect to time. The magnitude may comprise a temporal average magnitude. The controller may be configured to calculate a temporal average magnitude of each movement vector. The identification of the periphery of the towed vehicle may comprise comparing the magnitude of the plurality of movement vectors.

The controller may be configured to determine a gradient of the magnitude of the movement vectors. The gradient of the magnitude of the movement vectors represents a change in the magnitude relative to the distance between the sample locations. The distance between the sample locations may, for example, be measured in pixels within an image. By way of example, a first movement vector at a first coordinate (x1, y1) may have a first magnitude M1; and a second movement vector at a second co-ordinate (x2, y2) may have a second magnitude M2. The gradient of the magnitude in the x-direction would be (M2−M1)/(x2−x1); and the gradient of the magnitude in y-direction, (M2−M1)/(y2−y1). It will be understood, therefore, that the gradient of the magnitude of the movement vectors may define how the magnitude changes spatially over the image within a single image. The calculated gradient of the magnitude may be averaged over time. The controller may be configured to calculate a temporal average gradient. The periphery of the towed vehicle may be identified in dependence on the determined gradient. The determined gradient may be compared to a threshold to identify the periphery of the towed vehicle. Any determined gradient which is greater than the threshold may be considered as representing a significant boundary in the image, for example corresponding to a periphery of the towed vehicle. The threshold may be predefined or may be calculated dynamically.

The movement vectors may be generated for the entirety of the towing vehicle image.

The controller may be configured to apply a closing algorithm to close the identified periphery of the towed vehicle.

The controller may be configured to select a trailer image component of the towing vehicle image in dependence on the identified periphery of the towed vehicle.

The controller may be configured to receive trailer image data corresponding to a trailer image captured by a trailer camera. The controller may optionally overlay the trailer image component onto the trailer image.

The controller may be configured to receive trailer image data corresponding to a trailer image captured by a trailer camera. The controller may be configured to select a component of the towed vehicle image in dependence on the identified periphery of the towed vehicle. The obscured component may, for example, correspond to a region behind the towed vehicle which is obscured from view (from the perspective of the driver of the towing vehicle) by the towed vehicle. The controller may overlay the obscured component onto the towing vehicle image. The controller may optionally be configured to re-scaling the obscured component to allow for the longitudinal offset between the towing vehicle camera and the trailer camera. The transparency of the corresponding region of the towing vehicle image (i.e. the region identified as corresponding to the towed vehicle) may optionally be increased. By increasing the transparency such that the towing vehicle image is partially transparent, the trailer may be visible in the composite image, for example as a semi-transparent ("ghost") image.

The controller may be configured to output a composite image generated in dependence on the combined towing vehicle image and the towed vehicle image. The composite image may, for example, be output to a display screen.

The controller may perform optical flow analysis of the towing vehicle image data to generate the movement vectors.

According to a further aspect of the present invention there is provided a method of identifying a periphery of a towed vehicle connected to a towing vehicle, the method comprising:
  receive towing vehicle image data corresponding to a towing vehicle image;
  generate a plurality of movement vectors for the towing vehicle image; and
  identify the periphery of the towed vehicle based on said movement vectors.

The method may comprise identifying the periphery of the towed vehicle only when a reference speed of the vehicle is greater than or equal to a predefined speed threshold. A reference speed may be received from a suitable speed sensor provided on the vehicle. Alternatively, the method may comprise identifying the periphery of the towed vehicle only when an average magnitude of the movement vectors exceeds a predefined threshold.

Each of the movement vectors may comprise a magnitude. The movement vectors may each comprise a scalar value having x and y directional components (where x and y correspond to image axes). The x and y directional components may be combined to determine the magnitude of each movement vector.

The magnitude of the movement vectors may comprise an instant magnitude determined at a particular time. Alternatively, the magnitude of the movement vectors may be analysed with respect to time. For example, an average or mean magnitude may be determined with respect to time. The magnitude may comprise a temporal average magnitude. The method may comprise calculating a temporal average magnitude of each movement vector. The method may comprise identifying the periphery of the towed vehicle comprises comparing the magnitude of the plurality of movement vectors.

The method may comprise determining a gradient of the magnitude of the movement vectors. The calculated gradient of the magnitude may be averaged over time. The method may comprise identifying the periphery of the towed vehicle in dependence on the determined gradient. The method may comprise comparing the determined gradient to a threshold to identify the periphery of the towed vehicle. Any determined gradient which is greater than the threshold may be considered as representing a significant boundary in the image, for example corresponding to a periphery of the towed vehicle. The threshold may be predefined or may be calculated dynamically.

The method may comprise generating the movement vectors for the entirety of the towing vehicle image.

The method may comprise applying a closing algorithm to close the identified periphery of the towed vehicle.

The method may comprise selecting a trailer image component of the towing vehicle image in dependence on the identified periphery of the towed vehicle. The method may comprise receiving trailer image data corresponding to a trailer image captured by a trailer camera. The method may comprise overlaying the trailer image component onto the trailer image.

The method may comprise receiving trailer image data corresponding to a trailer image captured by a trailer camera. The method may comprise selecting a component of the towed vehicle image in dependence on the identified periphery of the towed vehicle. The method may comprise overlaying the obscured component onto the towing vehicle image. The obscured component may, for example, correspond to a region behind the towed vehicle which is obscured from view (from the perspective of the driver of the towing vehicle) by the towed vehicle. The method may comprise overlaying the obscured component onto the towing vehicle image. The method may optionally comprise re-scaling the obscured component to allow for the longitudinal offset between the towing vehicle camera and the trailer camera. The transparency of the corresponding region of the towing vehicle image (i.e. the region identified as corresponding to the towed vehicle) may optionally be increased. By increasing the transparency such that the towing vehicle image is partially transparent, the trailer may be visible in the composite image, for example as a semi-transparent ("ghost") image.

The method may comprise outputting a composite image generated in dependence on the combined towing vehicle image and the towed vehicle image.

The method may comprise performing optical flow analysis to generate the movement vectors for the towing vehicle image data.

According to a further aspect of the present invention, there is provided a non-transitory computer-readable medium having a set of instructions stored therein which, when executed, cause a processor to perform the method described herein.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which:

FIG. 9 shows a third image illustrating the temporal average magnitudes having a gradient greater than a threshold.

DETAILED DESCRIPTION

A rear-view display system 1 in accordance with an embodiment of the present invention will now be described with reference to the accompanying figures. The rear-view display system 1 is intended for use in a towing vehicle V connected to a towed vehicle T. The towed vehicle T in the present embodiment comprises a trailer T. The towing vehicle V has a first longitudinal axis X1, and the trailer T has a second longitudinal axis X2.

Figure 1:
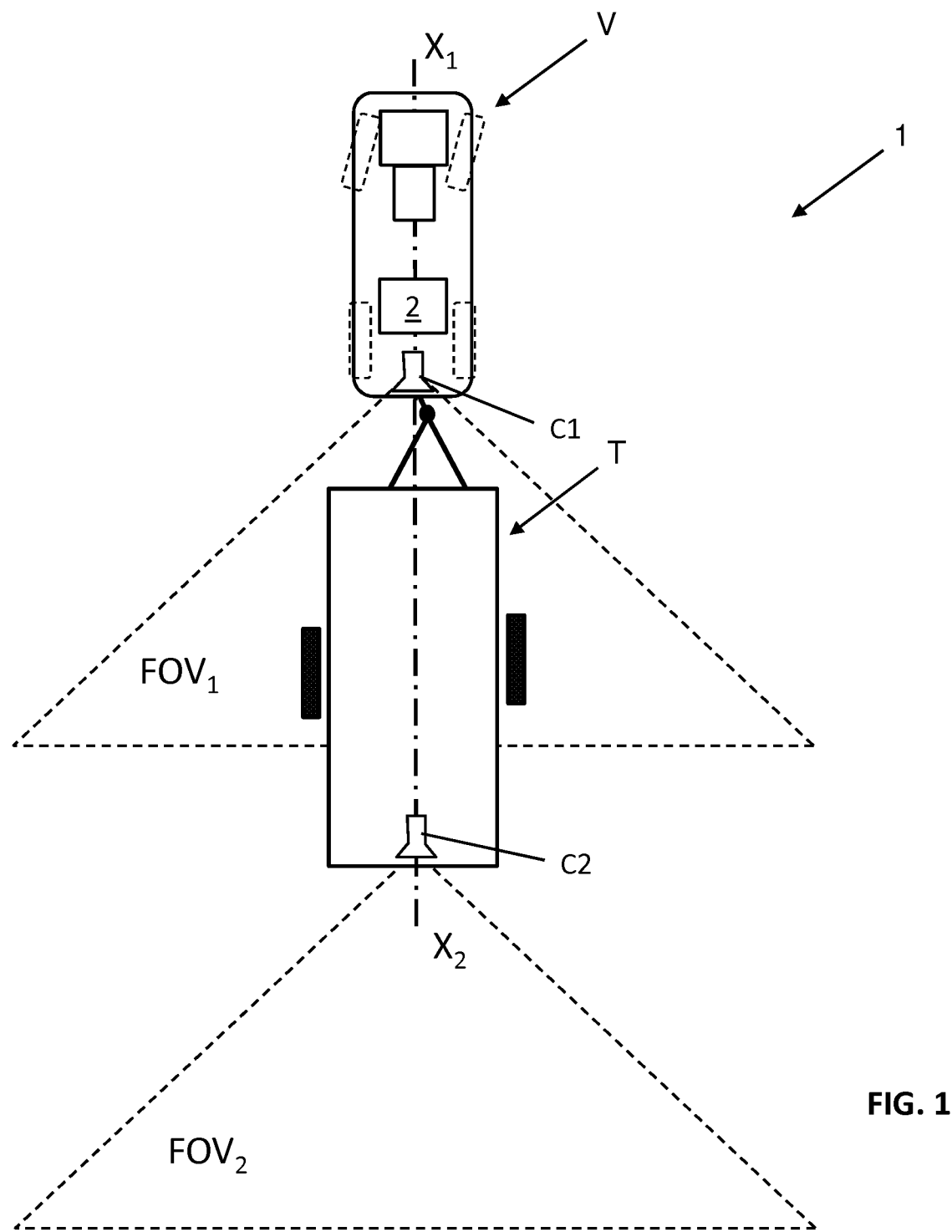
FIG. 1 shows a vehicle and a trailer incorporating a rear-view display system in accordance with an embodiment of the present invention.

As shown in FIG. 1, the rear-view display system 1 comprises a controller 2, a towing vehicle camera C1 and a trailer camera C2. The towing vehicle camera C1 is disposed at the rear of the towing vehicle V and is oriented in a rear-facing direction. The towing vehicle camera C1 has an optical axis substantially parallel to the first longitudinal axis X1. The towing vehicle camera C1 has a first field of view FOV1 which encompasses a region to the rear of the towing vehicle V. In use, the towing vehicle camera C1 captures towing vehicle image data DV1 corresponding to a towing vehicle image IMG1. The towing vehicle image IMG1 comprises a rear-facing scene from the towing vehicle V captured by the towing vehicle camera C1. The towing vehicle image IMG1 may, for example, include at least a portion of a front of the trailer T as well as some of the environment around the trailer T, for example to the sides and/or above and/or below the trailer T. The trailer camera C2 is disposed at the rear of the trailer T and is oriented in a rear-facing direction. The trailer camera C2 has an optical axis substantially parallel to the second longitudinal axis X2. The trailer camera C2 has a second field of view FOV2 which encompasses a region to the rear of the trailer T. In use, the trailer camera C2 captures trailer image data DV2 corresponding to a trailer image IMG2. The trailer image IMG2 comprises a rear-facing scene from the trailer T captured by the trailer camera C2. The trailer image IMG2 may, for example, include an image of the road behind the trailer T and other vehicles behind the trailer T. The horizontal and/or vertical extent of the towing vehicle image IMG1 and/or the trailer image IMG2 depend on the viewing angle of the towing vehicle camera C1 and the trailer camera C2.

Figure 2:
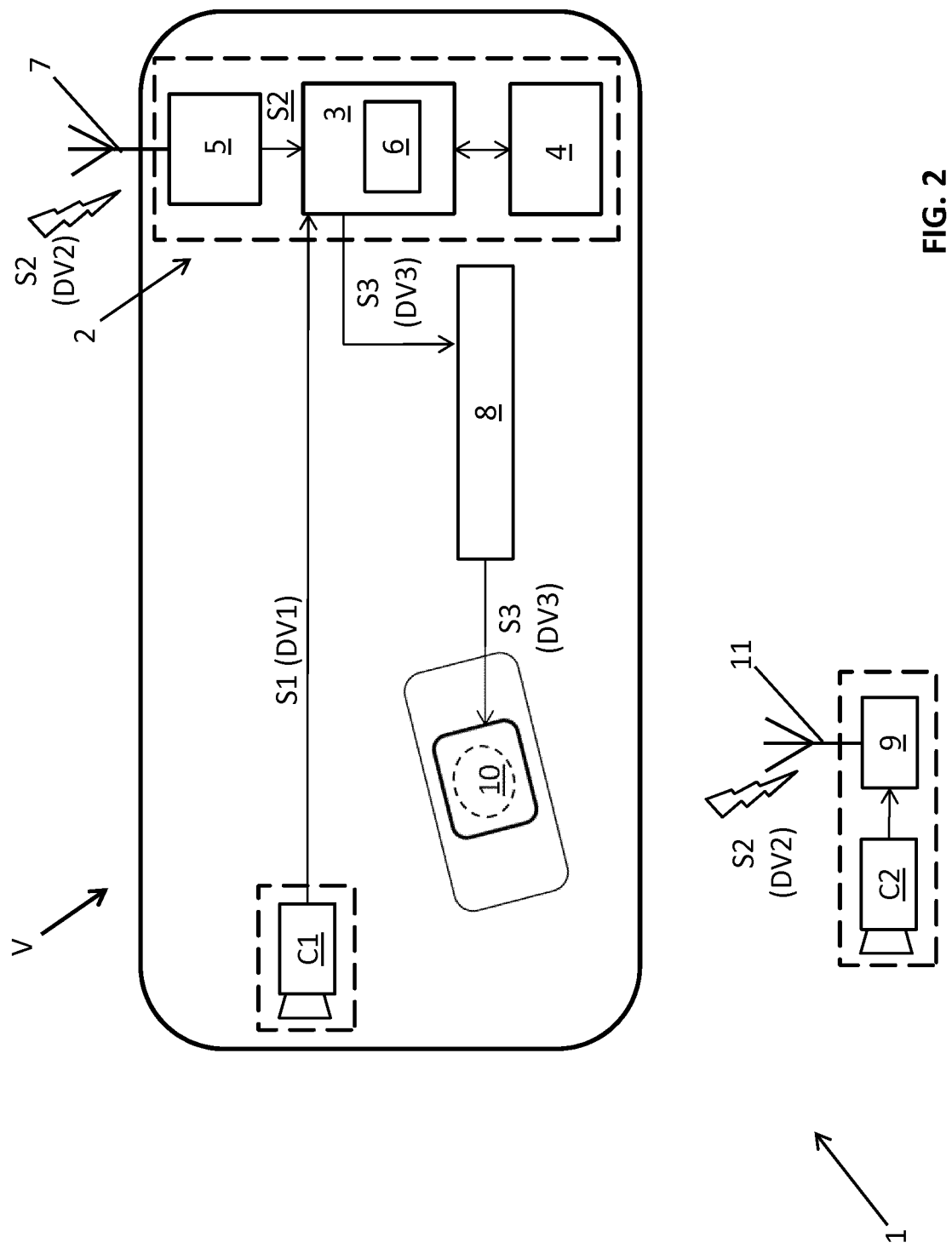
FIG. 2 shows a schematic representation of the components of the rear-view display system shown in FIG. 1.

In the present embodiment, the controller 2 is disposed in the towing vehicle V. As shown in FIG. 2, the controller 2 comprises a processor 3 connected to a system memory 4, and a wireless receiver 5. The processor 3 is configured to execute a set of software instructions held in the system memory 4 and implements an image processing module (denoted by the reference numeral 6). The processor 3 is connected to a communication bus 8, such as the towing vehicle CAN bus, for communicating with other towing vehicle systems. The wireless receiver 5 comprises a first antenna 7. The trailer camera C2 is connected to a wireless transmitter 9 having a second antenna 11. In use, the wireless transmitter 9 transmits the trailer image data DV2 captured by the trailer camera C2 to the wireless receiver 5. The towing vehicle V comprises a display screen 10 on which the towing vehicle and trailer images received from the respective vehicle and trailer cameras C1, C2 can be selectively displayed.

The towing vehicle and trailer cameras C1, C2 are both rear-facing digital cameras for generating video images. The towing vehicle and trailer cameras C1, C2 each comprise a wide-angle lens to provide a viewing angle of approximately 180°. The towing vehicle camera C1 is mounted centrally at the rear of the towing vehicle V above a rear license plate (not shown) and, in the present embodiment, can selectively function as a reversing camera to provide a parking aid when there is no trailer T coupled to the towing vehicle V. The trailer camera C2 is mounted centrally at the rear of the trailer T. The towing vehicle and trailer cameras C1, C2 are arranged at approximately the same vertical height above ground level. In alternate arrangements, the towing vehicle and trailer cameras C1, C2 can be offset from each other in a vertical and/or transverse direction. The image processing module 6 can be configured to correct for any such positional offset. Equally, the image processing module 6 can be configured to correct for an angular offset between the towing vehicle and trailer cameras C1, C2, for example if one or both of the towing vehicle camera C1 and the trailer camera C2 are angularly offset from the respective first and second longitudinal axes X1, X2.

The towing vehicle camera C1 outputs a first signal S1 comprising said towing vehicle image data DV1 corresponding to the towing vehicle image IMG1. The first signal S1 is published to the communication bus 8 and provides a first input for the image processing module 6. The trailer camera C2 outputs said trailer image data DV2 corresponding to the trailer image IMG2. The second signal S2 is transmitted by the wireless transmitter 9 to the wireless receiver 5 to provide a second input for the image processing module 6. The wireless transmitter 9 can transmit the second signal S2 using a suitable wireless communication standard, such as Wi-Fi®. In a variant, the second signal S2 could be transmitted over a wired connection between the trailer T and the towing vehicle V.

The image processing module 6 is configured to combine a portion of the towing vehicle image data DV1 with the trailer image data DV2 to generate a composite image data DV3. As described herein, the image processing module 6 is configured to analyse the towing vehicle image IMG1 to identify a periphery P1 of the trailer T. The periphery P1 represents the external visible boundary (or edge) of the trailer T from the view point of the vehicle mounted camera C1. The region of the towing vehicle image IMG1 enclosed by the periphery P1 represents the trailer T and is referred to herein as the trailer image component TC1 (shown in FIG. 5) of the towing vehicle image IMG1. A hidden or obscured component TC2 of the towed vehicle image IMG2 corresponding to the periphery P1 may be selected for overlay onto the towing vehicle image IMG1. The obscured portion TC2 of the towed vehicle image IMG2 is selected in dependence on the periphery P1 of the trailer T. The towing vehicle image data DV1 and the trailer image data DV2 are combined such that the obscured component TC2 of the towed vehicle image IMG2 is overlaid onto a corresponding region of the towing vehicle image IMG1. The obscured component TC2 is rendered as a semi-transparent image such that the features of the trailer image IMG2 representing the trailer T remain visible. Thus, the composite image DV3 provides a continuous, uninterrupted view of the region behind the trailer T with an overlay comprising an image of the trailer T (as viewed from the rear of the towing vehicle V). By showing an image of the trailer T, the driver of the towing vehicle V may more readily determine the relative position of the trailer T to other objects visible in the trailer image IMG2. To reduce obfuscation, the obscured component TC2 of the towed vehicle image IMG2 which is overlaid onto the towing vehicle image IMG1 should match the visible outline of the trailer T as closely as possible. It will be understood that changes in the relative orientation of the trailer T relative to the towing vehicle V cause the visible portion of the trailer T in the towing vehicle image IMG1 to change. This problem is exacerbated by the fact that trailers T having different sizes and/or shapes may be connected to the towing vehicle V. As a result, there may be significant variations in the profile of the trailer T when viewed within the towing vehicle image IMG1. In order to compensate for these variations, the image processing module 6 is configured to analyse the towing vehicle image data DV1 to dynamically identify a periphery of the trailer T within the towing vehicle image IMG1. The obscured component TC2 of the trailer image IMG2 may be selected dynamically in dependence on said identification. The identification and selection of the trailer image component TC1 by the image processing module 6 will now be described.

The image processing module 6 is configured to analyse the towing vehicle image data DV1 to detect a perimeter periphery P1 of the trailer T within the towing vehicle image IMG1. In the present embodiment, the image processing module 6 is configured to compute a dense optical flow between two or more frames of the towing vehicle image IMG1. The dense optical flow is calculated across the entire captured scene in the towing vehicle image IMG1. This analysis is performed when the towing vehicle V and the trailer T are moving. The image processing module 6 calculates optical flow vectors of pixels between two or more frames of the towing vehicle image IMG1, for example between consecutive frames. The optical flow vectors are calculated for pixels distributed regularly throughout the towing vehicle image IMG1, for example in a grid arrangement. The resulting optical flow vectors are distributed regularly across the entire frame. Other analysis techniques may be used to derive the optical flow vectors without departing from the scope of the present invention. When the towing vehicle V and the trailer T are moving, the optical flow vectors of pixels within a region of the towing vehicle image IMG1 corresponding to the trailer T have a relatively small magnitude (since movements of the trailer T relative to the towing vehicle V remain relatively low even when the towing vehicle V is in motion), and the optical flow vectors of pixels within a region of the towing vehicle image IMG1 corresponding to a region around the trailer T have a relatively large magnitude (since movements of background features are relatively high when the towing vehicle V is in motion).

The image processing module 6 seeks to identify a region in the towing vehicle image IMG1 where the optical flow vectors transition from having a relatively small magnitude to having a relatively high magnitude; this represents the periphery P1 of the trailer T. To perform this analysis, the image processing module 6 calculates the magnitude of the optical flow vectors within the towing vehicle image IMG1. In the present embodiment, the magnitude of the optical flow vectors is averaged with respect to time, for example over successive frames of the towing vehicle image IMG1. The calculation of the temporal average magnitude is performed across the entire scene captured in the towing vehicle image IMG1. A gradient of the magnitude of the optical flow vectors is then calculated across the towing vehicle image IMG1. The gradient of the magnitude of the optical flow vectors may be averaged over time. The gradient is calculated for motion vectors disposed proximal to each other to provide an indication of their movement relative to each other. The gradient provides a representation of the rate of change of the magnitude of the optical flow vectors spatially within vehicle trailer image IMG1. The gradient is directly proportional to the difference in the magnitude of the optical flow vectors and is greatest where the changes in the magnitude are most pronounced. The gradient is expected to be largest at the periphery P1 of the trailer T where pixels associated with a region of the towing vehicle image IMG1 relating to the trailer T (and having a relatively low movement) are disposed proximal to or adjacent to pixels associated with a region of the towing vehicle image IMG1 relating to the background (and having a relatively high movement). The image processing module 6 applies a predetermined threshold to the determined magnitudes to identify the periphery P1 of the trailer T. The identified periphery P1 may be incomplete, for example in regions where pixels are not identified in the towing vehicle image IMG1. The image processing module 6 completes the periphery P1, for example utilising a morphological closing technique, to form a closed region. The closed region is identified as the trailer image component TC1 of the towing vehicle image IMG1 corresponding to the trailer T. The technique described herein can be used to detect irregularly shaped objects and trailers T being towed by the towing vehicle T, without requiring that a region of interest is pre-defined in the image. The selection of the trailer image component TC1 may, therefore, be performed automatically.

The image processing module 6 may store a model of the trailer T comprising the periphery P1 and optionally also the image data contained therein (which represents the trailer T). The stored model may be used for detection in future utilisations of the rear-view display system 1. The stored model may be used subsequently to define the edge of the trailer T, for example when the towing vehicle V is moving at a speed less than the pre-defined speed threshold. The stored model may, for example, be used as an initial template until the towing vehicle speed is greater than or equal to the predefined speed threshold for calculating the periphery P1. Alternatively, or in addition, the stored model may be accessed by the image processing module 6 for use the next time the towing vehicle V is used to tow the trailer T.

It will be appreciated that the calculated gradient of the optical flow vectors will increase with vehicle speed, since this typically results in an increase in the magnitude of the optical vectors calculated for pixels relating to a background portion of the towing vehicle image IMG1. The image processing module 6 may be configured to identify the towing vehicle image IMG1 only when the towing vehicle speed is greater than or equal to a predefined speed threshold. In this arrangement, the image processing module 6 may be configured to receive a reference speed signal VREF, for example from the communication bus 8. The image processing module 6 may be configured to identify the periphery P1 only when the reference speed signal VREF identifies a towing vehicle speed greater than or equal to the predefined speed threshold. Rather than control the process in dependence on a determined vehicle speed, the image processing module 6 may detect the periphery P1 when the magnitude of one or more of the calculated optical flow vectors (or an average magnitude of the optical flow vectors over the entirety of the towing vehicle image IMG1) is greater than a predetermined threshold.

As described herein, the image processing module 6 combines the towing vehicle image data DV1 and the trailer image data DV2 to generate the composite image data DV3. When the towing vehicle V and the trailer T are aligned with each other (such that the first and second longitudinal axes X1, X2 are coincident), the first and trailer images IMG1, IMG2 are in respect of the same scene but may be offset from each other due to a longitudinal and/or vertical offset of the first and second cameras C1, C2. The image processing module 6 is configured to implement an image matching procedure to align the towing vehicle image IMG1 with the trailer image IMG2. The image processing module 6 may be configured to implement a cross-correlation technique automatically to match features common to both the towing vehicle image IMG1 and the trailer image IMG2. The image processing module 6 utilises the results of the cross-correlation to perform image registration such that the first and trailer images IMG1, IMG2 are aligned with each other. The image registration can comprise one or more of the following transforms: image rotation, scaling, cropping, magnification (zooming), skew correction and translation. The selected component TC2 of the trailer image IMG2 is then overlaid onto the towing vehicle image IMG1 to form the composite image IMG3 (for example using alpha-compositing techniques). The transparency of the selected trailer image component TC1 in the towing vehicle image IMG1 may optionally be increased. The resulting composite image IMG3 is output to a display screen 10 visible to a driver of the towing vehicle V, for example in a centre console or instrument cluster.

Figure 3A:
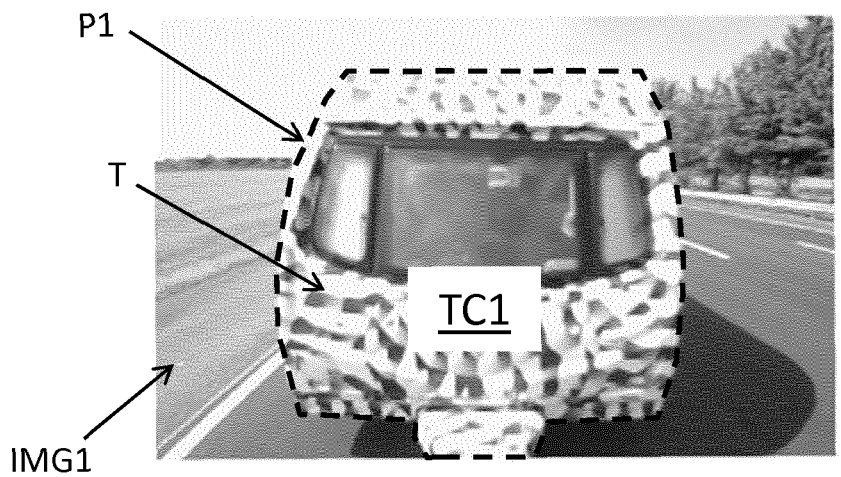
FIG. 3A shows a towing vehicle image from a towing vehicle camera disposed on the towing vehicle.
Figure 3B:
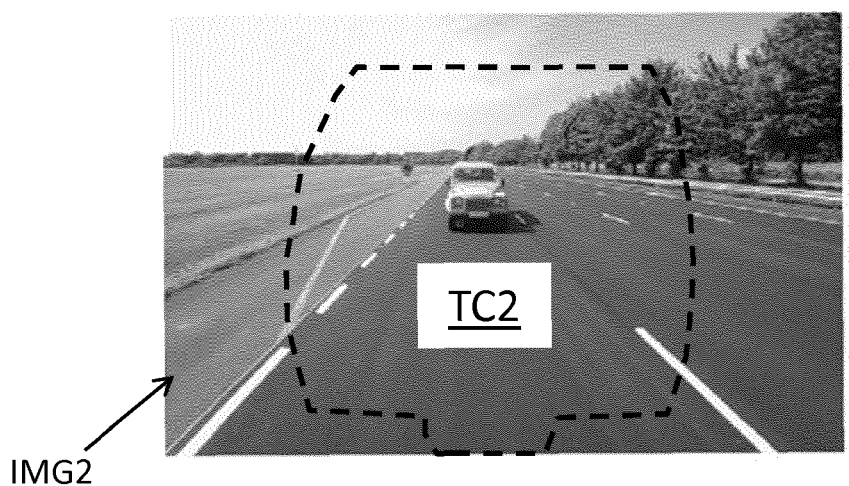
FIG. 3B shows a trailer image from a trailer camera disposed on the trailer.
Figure 5:
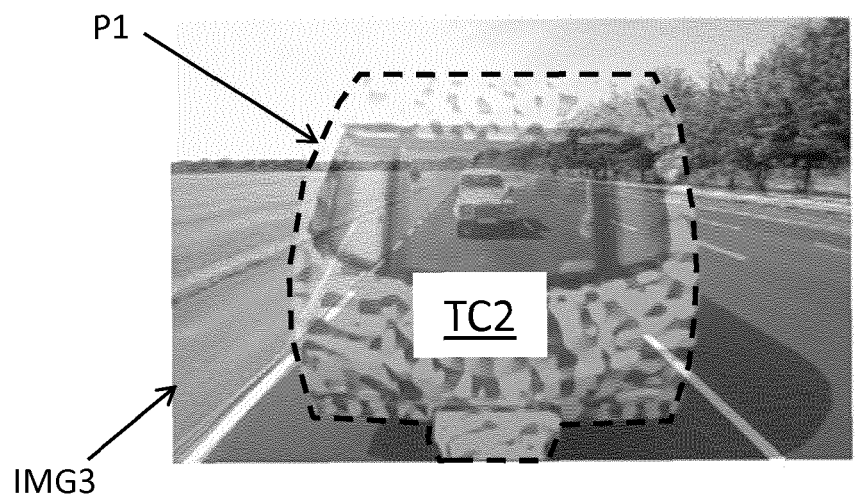
FIG. 5 shows a composite image generated by combining the towing vehicle and trailer images shown in FIGS. 3A and 3B.
Figure 4:
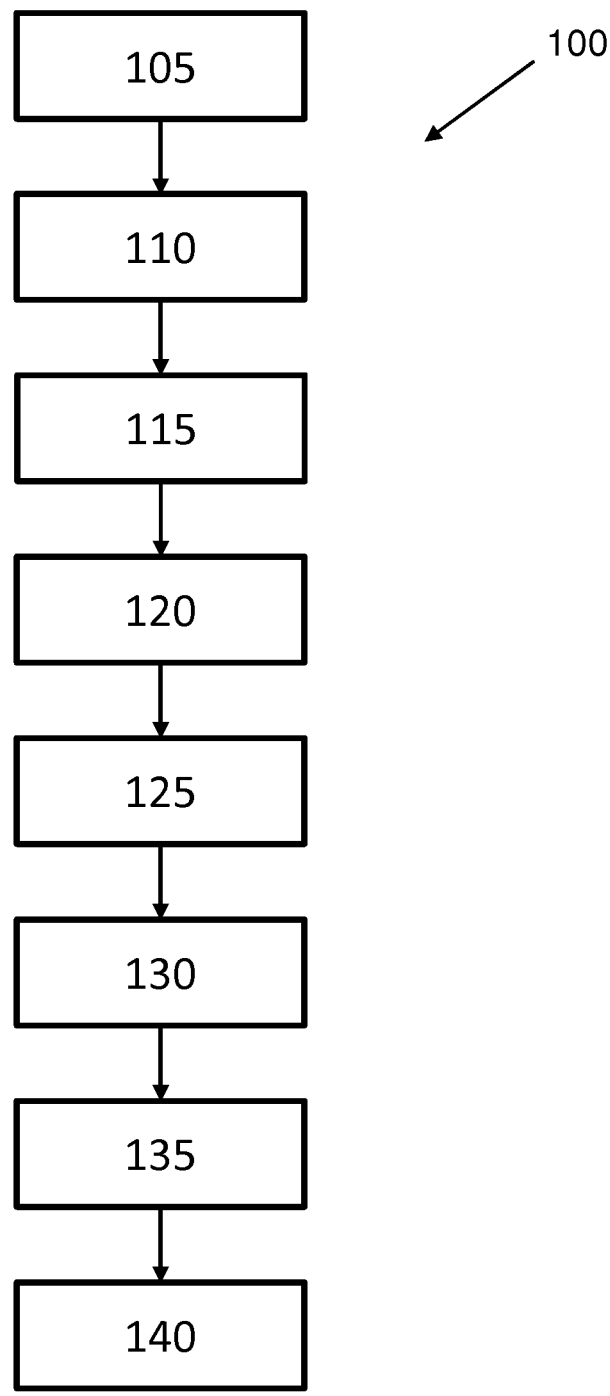
FIG. 4 shows a block diagram representing the processing of the towing vehicle image to determine a periphery of the trailer.
Figure 6:
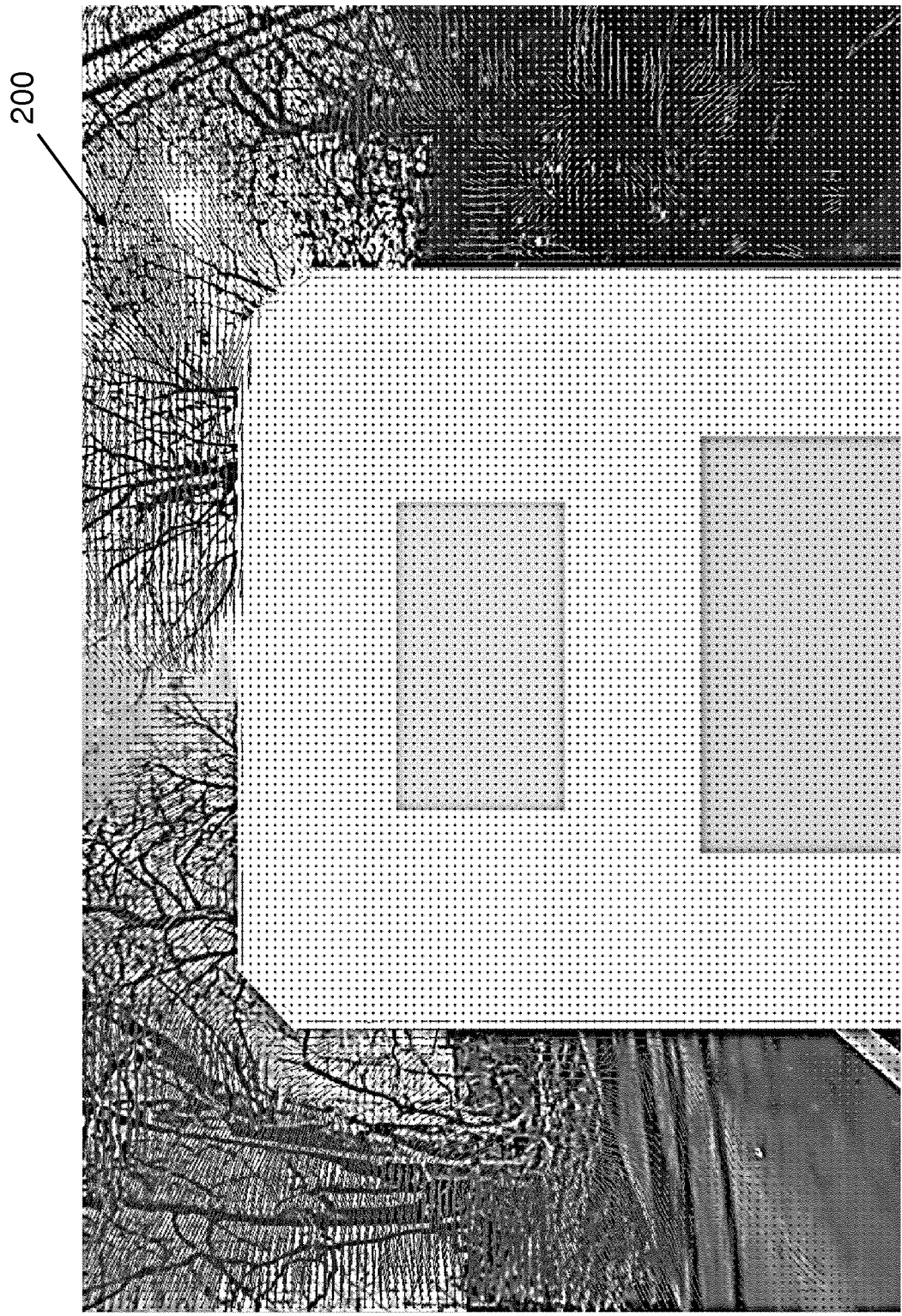
FIG. 6 shows a first image illustrating the optical flow vectors within an image captured by the towing vehicle camera.
Figure 7:
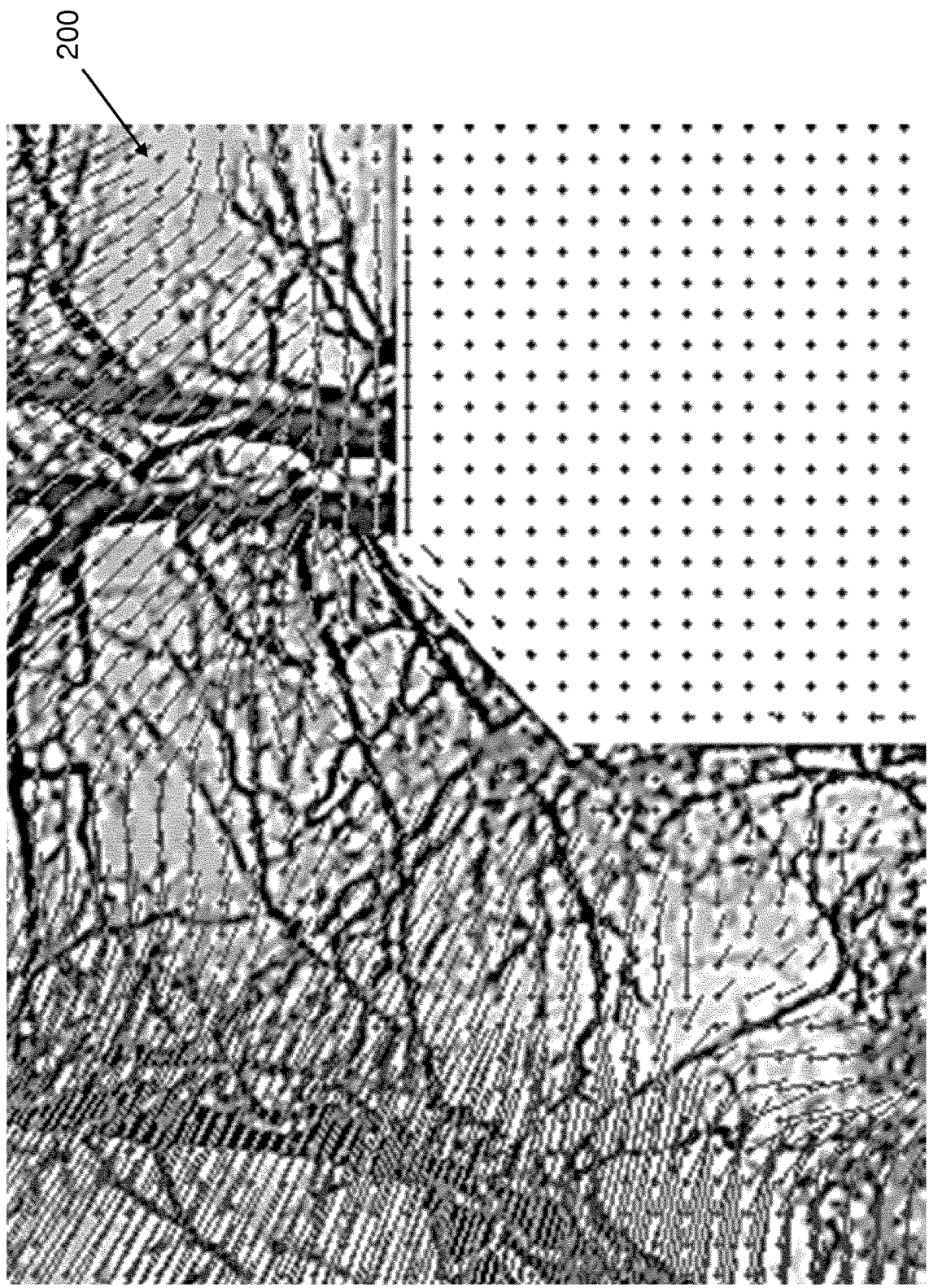
FIG. 7 shows an enlarged portion of the first image shown in FIG. 6.
Figure 8:
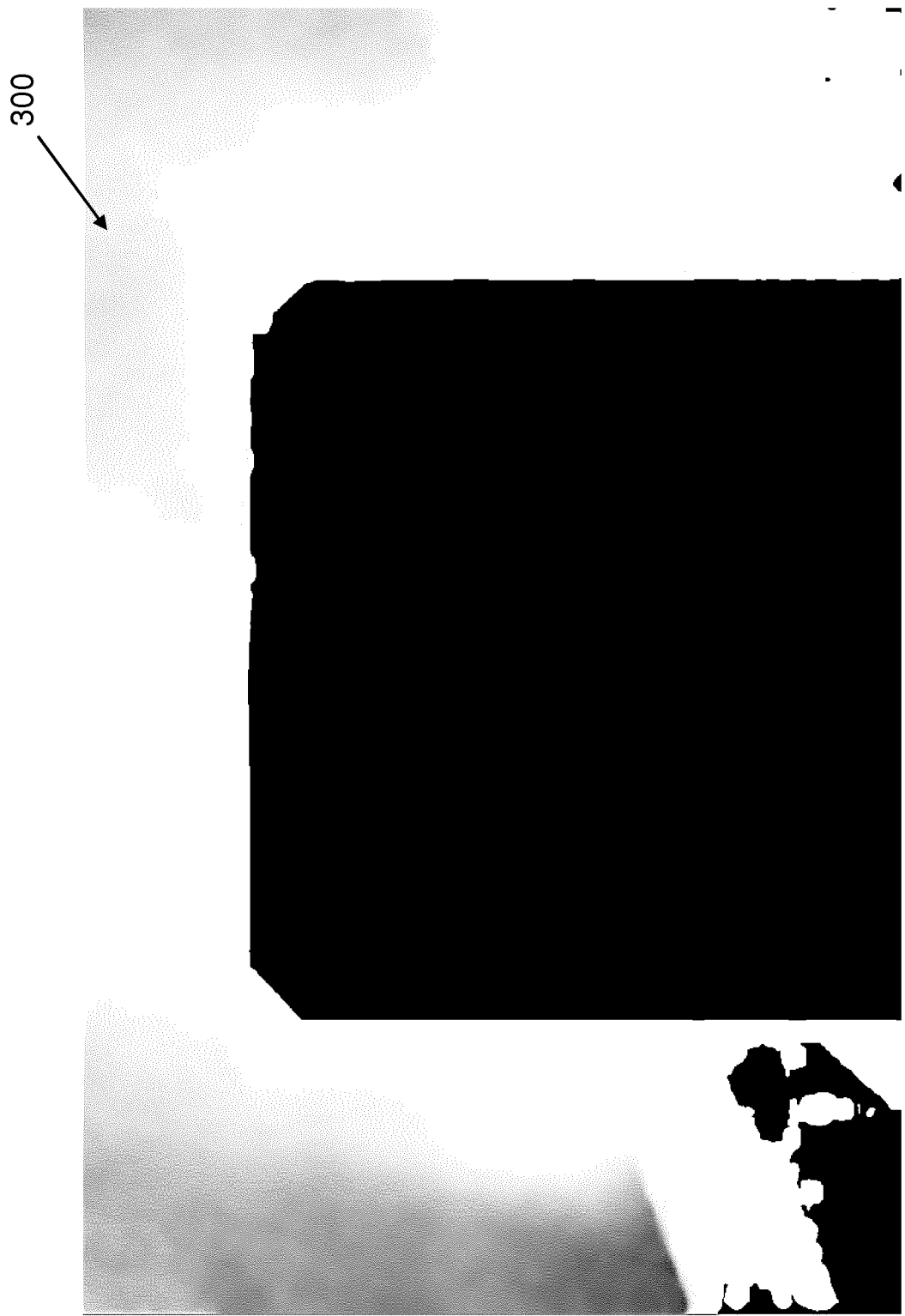
FIG. 8 shows a second image illustrating the temporal average magnitude of the optical flow vectors for the image shown in FIGS. 6 and 7.

The operation of the rear-view display system 1 in accordance with an embodiment of the present invention will now be described with reference to FIGS. 3 to 9. The first camera C1 generates towing vehicle image data DV1 corresponding to a towing vehicle image IMG1 which includes the front of the trailer T being towed behind the towing vehicle V, as shown in FIG. 3A. The second camera C2 generates trailer image data DV2 corresponding to a trailer image IMG2 which is an unobstructed view of the region behind the trailer T, as shown in FIG. 3B. The image processing module 6 processes the towing vehicle image IMG1 to identify the periphery P1 of the trailer T. A block diagram 100 showing the computation of the periphery P1 is illustrated in FIG. 4. The image processing module 6 computes a dense optical flow across the entire scene captured in the towing vehicle image IMG1 (STEP 105). A first image 200 illustrating the dense optical flow across the scene captured by the first camera C1 is shown in FIG. 6; and an enlarged view of a portion of the first image 200 is shown in FIG. 7. The magnitude of the optical flow vectors is calculated and averaged over successive frames to generate a temporal average magnitude across the towing vehicle image IMG1 (STEP 110). A second image 300 illustrating the temporal average magnitude is shown in FIG. 8. The gradient of the temporal average vector magnitudes is calculated across the towing vehicle image IMG1 (STEP 115). The calculated gradients are compared to a threshold; the gradients which are greater than the threshold are retained to detect an edge in the towing vehicle image IMG1 (STEP 120). A third image 400 is shown in FIG. 9 illustrating the gradients having a value greater than the threshold. The threshold in the present embodiment is predefined, but it could be calculated dynamically, for example based on a peak or average magnitude of the optical flow vectors within the captured scene. As shown in FIG. 9, the periphery P1 of the trailer T is identifiable following application of the threshold to the gradient data for the image. The gradient edge is detected until a closed region is formed (STEP 125). Morphological closing is performed on the region enclosed by the periphery P1 defined by the gradient edge (STEP 130). The closed region is characterised as the trailer image component TC1 of the towing vehicle image IMG1 corresponding to the trailer T (STEP 135). The detected edge, and the image data stored therein, is stored (STEP 140). The image processing module 6 may optionally implement an image matching procedure to match (align) the towing vehicle image IMG1 and the trailer image IMG2. The towing vehicle image IMG1 and the trailer image IMG2 are combined to form the composite image IMG3, as shown in FIG. 5. The composite image IMG3 is output as a third signal S3 for display on a display screen 10, such as a liquid-crystal display, provided in the towing vehicle. The display screen 10 can, for example, be provided in a centre console or an instrument cluster. Alternatively, or in addition, the display screen can be incorporated into a rear view mirror, for example to display the composite image IMG3 alongside a reflective image.

It will be understood that the profile of the identified periphery P1 may be updated dynamically at least substantially in real-time to reflect changes in the position and/or orientation of the trailer T relative to the vehicle V. As such, the selected trailer image component TC1 of the towing vehicle image IMG1 overlaid onto the trailer image IMG2 may be modified dynamically.

In the illustrated example, the towing vehicle V is an automobile (for example a sports utility vehicle) and the trailer T is a caravan. It will be appreciated, however, that the apparatus and method(s) described herein are not limited in this respect and could be implemented in other types and categories of vehicle and to other types of trailer. The apparatus and method(s) could, for example, be applied to an articulated vehicle, a semi-trailer or a tractor-trailer.

It will be appreciated that further changes and modifications can be made to the apparatus and method described herein without parting from the scope of the present invention.

The rear-view display system 1 described herein could be modified to combine the images from more than two cameras, for example to incorporate the images generated by one or more cameras mounted to a side of the towing vehicle V and/or the trailer T. The image processing module 6 may perform additional image processing, for example to apply a smoothing algorithm to the periphery P1. The identified periphery P1 could be overlaid directly onto the trailer image IMG1, for example to represent a silhouette or an outline of the trailer T.

The system 1 has been described herein with particular reference to combining the towing vehicle image IMG1 and the trailer image IMG2. However, it will be understood that the methods and apparatus described herein may be used in other applications on a towing vehicle V. For example, the same techniques may be used to form a composite image representing a region in front of the towing vehicle, for example to identify a portion of the bonnet and/or vender of the towing vehicle V to be overlaid as a semi-transparent image on top of an image a camera disposed on the front of the towing vehicle.

The invention claimed is:

1. A controller for identifying a periphery of a towed vehicle connected to a towing vehicle, the controller being configured to:
   receive towing vehicle image data corresponding to a towing vehicle image captured by a towing vehicle camera;
   process the towing vehicle image data to generate a plurality of movement vectors;
   calculate a magnitude of each of the plurality of movement vectors;
   determine a gradient of the magnitude of the movement vectors, wherein the gradient represents a change in magnitude relative to a distance between pixel positions of the respective motion vectors; and
   identify the periphery of the towed vehicle based at least in part on the determined gradient.

2. A controller as claimed in claim 1, wherein the controller is further configured to identify the periphery of the towed vehicle only when a reference speed of the vehicle is either greater than or equal to a predefined speed threshold.

3. A controller as claimed in claim 1, wherein the controller is further configured to identify the periphery of the towed vehicle only when an average magnitude of the movement vectors exceeds a predefined threshold.

4. A controller as claimed in claim 1, wherein the movement vectors are generated for the entirety of the towing vehicle image.

5. A controller as claimed in claim 1, wherein the controller is further configured to apply a closing algorithm to close the identified periphery of the towed vehicle.

6. A controller as claimed in claim 1, wherein the controller is further configured to:
   receive towed vehicle image data corresponding to a towed vehicle image captured by a towed vehicle camera; and
   select a component of the towed vehicle image based at least in part on the identified periphery of the towed vehicle.

7. A controller as claimed in claim 6, wherein the controller is further configured to:
   overlay the component onto the towing vehicle image.

8. A controller as claimed in claim 1, wherein the controller is further configured to perform an optical flow analysis of the towing vehicle image data to generate the movement vectors.

9. A method of identifying a periphery of a towed vehicle connected to a towing vehicle, the method comprising:
   receiving towing vehicle image data corresponding to a towing vehicle image;
   generating a plurality of movement vectors for the towing vehicle image;
   calculating a magnitude of each of the plurality of movement vectors;
   determining a gradient of the magnitude of the movement vectors, wherein the gradient represents a change in magnitude relative to a distance between pixel positions of the respective motion vectors; and
   identifying the periphery of the towed vehicle based at least in part on the determined gradient.

10. A non-transitory computer-readable medium having a set of instructions stored therein which, when executed, cause a processor to perform the method claimed in claim 9.

11. A controller as claimed in claim 1, wherein identifying the periphery of the towed vehicle comprises comparing the magnitude of the plurality of movement vectors.

12. A controller as claimed in claim 1, wherein the determined gradient is compared to a threshold to identify the periphery of the towed vehicle.

* * * * *